Feb. 22, 1944.  W. J. PODBIELNIAK  2,342,366
LOW TEMPERATURE APPARATUS FOR ANALYZING FLUIDS
Filed Nov. 8, 1939  3 Sheets-Sheet 2
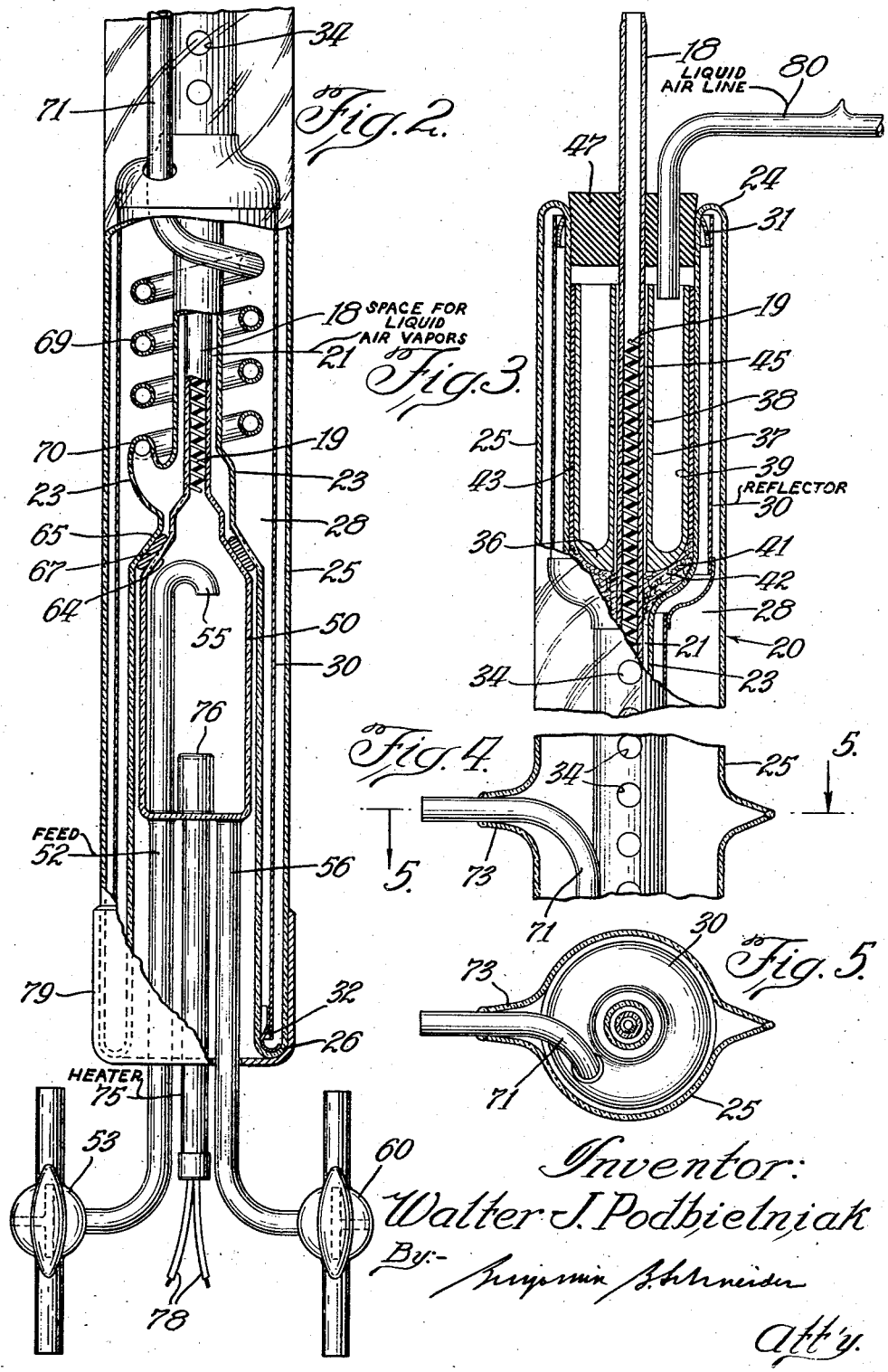

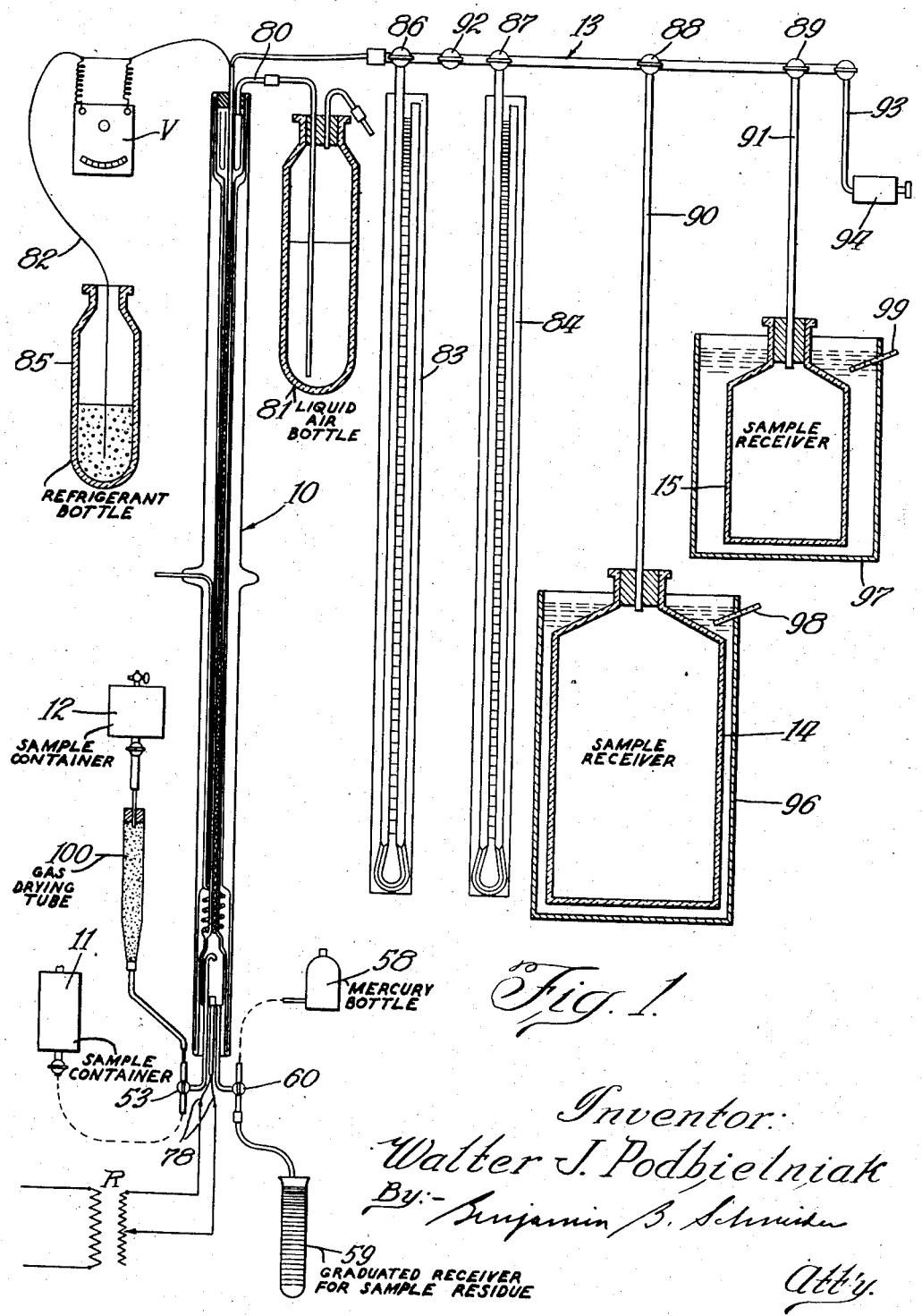

Feb. 22, 1944.   W. J. PODBIELNIAK   2,342,366
LOW TEMPERATURE APPARATUS FOR ANALYZING FLUIDS
Filed Nov. 8, 1939   3 Sheets-Sheet 3

Inventor:
Walter J. Podbielniak
By:—
Atty.

Patented Feb. 22, 1944

2,342,366

UNITED STATES PATENT OFFICE 2,342,366

LOW-TEMPERATURE APPARATUS FOR ANALYZING FLUIDS

Walter J. Podbielniak, Chicago, Ill., assignor to Benjamin B. Schneider

Application November 8, 1939, Serial No. 303,434

7 Claims. (Cl. 202—185)

This invention relates to improvements in the apparatus for the analytical fractionation of volatile liquids and of gases or vapors containing condensible liquid fractions, and more particularly to improvements in the low-temperature fractionating methods and apparatus disclosed in my Patent No. 1,917,272, granted July 11, 1933.

In the low-temperature fractionating columns of my prior patent as well as the other fractionating columns of the prior art, cold fluids, for example, vapors resulting from the evaporation of liquid air, are passed around the upper portions only of the insulated distilling tubes to provide reflux, and then discharged immediately to the atmosphere. Since the heat exchange surfaces of the reflux portions of the prior art fractionating columns are of limited area, little if any cooling effect of the vaporized liquid air is utilized to effect formation of reflux. In consequence, comparatively large amounts of liquid air are required to form the necessary reflux in these prior art columns, thereby materially increasing the operating costs. In the columns of the prior art, about 1.5 liters or more of liquid air are consumed for the formation of reflux during a typical distillation of natural or refinery gas, for example.

In all of these prior art fractionating columns, the spaces surrounding the elongated, intermediate portion of the distilling tube is superheated in respect of the natural or adiabatic temperature gradient of the column, due to the residual inward conduction of atmospheric heat through the vacuum jacket, and the fractionating effectiveness of the columns is thereby impaired. Since the distilling tubes of the prior art columns thus operate in a surrounding which tends to promote superheat throughout the tube and in localized areas, sharp fluctuations of column pressure occur, particularly in the latter instance, with consequent further impairment of the fractionating effectiveness of the columns. This is particularly true when distilling methane or ethane.

In accordance with the present invention, the above and other objections in the prior art analytical fractionating columns are overcome by utilizing the cold vapors resulting from the evaporation of the liquid air around the upper or reflux portion of the distilling tube as a supercooling medium for the elongated, intermediate portion of the tube within its insulating jacket. In the column of the present invention, the cold vapors of the liquid air or other cooling medium, instead of being discharged immediately, are caused to pass down and around the distilling tube and within the insulating jacket before being permitted to escape to the atmosphere. Thus, the heat exchange surface of my distilling tube is greatly increased and the sensible heat content of the evaporated liquid air is utilized to cool the vapors in the tube adjacent this surface. Since the cooling effect of the evaporated liquid air due to difference in sensible heat or temperature is far greater than that due to the latent heat of the liquid air, which latter is almost entirely relied on to effect formation of reflux in the prior art columns, it becomes apparent that the column of the present invention will require less liquid air to effect the necessary cooling than the prior art columns. The liquid air consumption for a typical distillation in a fractionating column in accordance with my present invention may be as low as 0.3 to 0.5 liters as contrasted to the at least 1.5 liters required in a similar typical distillation in a column in accordance with the prior art.

The fractionating column of the present invention has the further advantage that it is capable of effecting much sharper fractionation of the material being distilled without increase in sample size or distillation time. Furthermore, its use in a system for analyzing fluids results in lowering the usual time required to conduct such analyses with the prior art columns. For example, a gas analysis conducted with the aid of the fractionating column of the present invention can be conducted in about one-half to two-thirds the time it now takes with the prior art columns.

My method and apparatus possesses many other advantages which will be made apparent in the detailed description of an embodiment thereof in connection with the accompanying drawings. It is, of course, to be understood that my invention is not to be construed as limited to the details of the embodiment shown and described since these details may be varied without departing from the scope of my invention as defined in the appended claims.

Reference is made to the accompanying drawings wherein:

Figure 1 is a general illustrational view, diagrammatic in parts, of a complete apparatus embodying my novel fractionating column and which is utilized in the analysis of fluids;

Figs. 2 and 3 are enlarged longitudinal sections through the lower distillation and upper reflux portions respectively of the fractionating column, with parts in elevation and broken away;

Fig. 4 is a fragmentary longitudinal section, through the column with parts in elevation, showing a detail of construction thereof;

Fig. 5 is a transverse section taken along the line 5—5 of Fig. 4;

Figure 6:
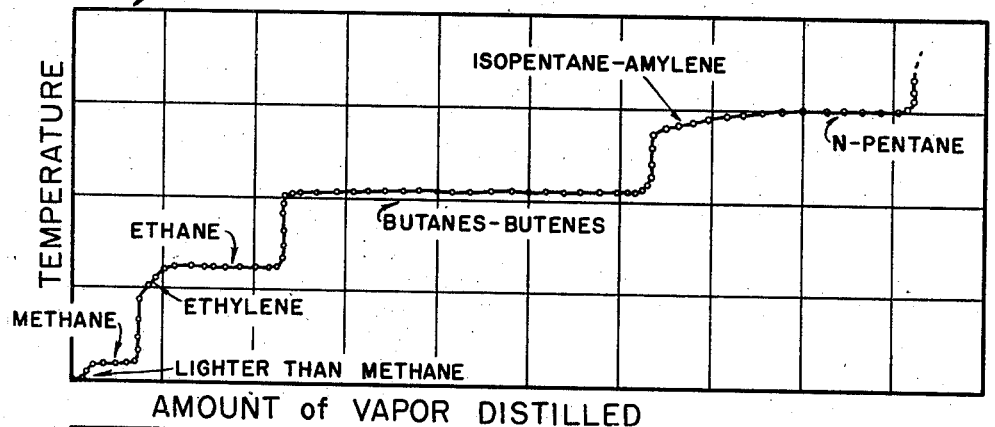
Figs. 6 and 7 illustrate comparative typical distillation curves plotted from data obtained during analyses or runs in a low-temperature fractionating apparatus of the prior art and in apparatus embodying my novel fractionating column respectively.

Referring to Fig. 1, the numeral 10 designates a fractionating column which may be supplied with liquid or gaseous samples to be analyzed from suitable containers 11 or 12, respectively. In general, the sample taken into the column is subjected to rectification and fractionation therein, and vaporized and uncondensed constituents of the sample are conducted from the column through the manifold 13 to suitable containers 14 and 15 of known volume. As will later appear, fractionated constituents of the sample being analyzed are maintained in vapor phase within the containers, and are quantitatively determined by measuring pressure changes therein.

As shown most clearly in Figs. 2 and 3 the fractionating column in accordance with the present invention, as illustrated, comprises an elongated distilling tube 18 which may be of any suitable dimensions, for example, 1 to 6 feet in length and, preferably not exceeding about 5 mm. internal diameter throughout all but the lower end thereof, which latter will be described hereinafter. I prefer that the tube have an internal diameter of from about 2.5 to about 3.5 mm. since I have noted that maximum fractionating efficiency is had with such a tube. Within these limits of internal diameter, capillary action is most effective in bringing about an extended and intimate contact of the vapor and refluxed liquid without flooding or priming of the tube. The tube is preferably provided with a packing 19, such as a coil of small wire, for the purpose of bringing about a more extended and intimate surface contacting of the downwardly flowing reflux liquid with the rising vapors. The coiled wire packings utilized for this purpose may be, for example, those described in my prior Patent No. 1,917,272.

Distilling tube 18 is surrounded and thermally insulated by an evacuated jacket 20, slightly spaced from the tube, as shown at 21, substantially throughout the length of the tube. Jacket 20 comprises an inner wall 23 and a spaced outer wall 25, closed at their upper and lower ends as at 24 and 26, respectively. The space 28 between the walls is evacuated as completely as possible to provide an effective thermal insulation throughout substantially the entire length of the distilling tube. Both the distilling tube 18 and the insulating jacket or container 20 are suitably formed of a low expansion, heat resistant glass, such as that commercially known as "Pyrex," or of quartz or other suitable material.

Within vacuum jacket 20 I preferably provide a reflector 30 extending throughout the length of the jacket. This reflector is resiliently mounted on springs 31 and 32. The reflector as in my prior Patent No. 1,909,315, granted May 16, 1933, is suitably constructed of light metal having a highly polished, reflecting surface on its interior, and preferably also on its exterior. Slots or perforations 34 may be provided at intervals along the length of the reflector member so that the action taking place within the distilling tube 18 may be viewed from the exterior. By the use of this reflecting member, the insulating efficiency of the jacket is markedly improved over that secured, for example, with ordinary silvered surfaces on the interior walls of the jacket. It is, of course, to be understood that the interior of the walls of the jacket may, if desired, be silvered and used with or without the reflector member, or that any other suitable effective insulating material or means may be employed in constructing the jacket.

Insulating jacket 20 is enlarged at its upper end to provide a space between the inner wall 23 of the jacket and the distilling tube 18 for a vessel 36, suitably of metal, into which liquid air is introduced for cooling the distilling tube to condense vapors therein and provide reflux. Vessel 36 may be, suitably, a double-walled, annular container, the inner wall being designated 37 and the outer wall 39. Suitable packing or baffle plates (not shown) may be positioned in the vessel to distribute liquid air vapors rising therein. Also, if desired, there may be placed in the vessel a suitable material having a high specific heat, for example, glass beads, as described in my prior patent.

Vessel 36 is supported in the reflux portion of the column, as by the glass wool insulating material 41 which is packed around the distilling tube and rests on the shoulder 42 of the inner wall 23. Additional support for the vessel is provided by the insulation material 43, suitably asbestos, which is positioned between the outer wall 39 of the vessel and the inner wall 23 of the jacket.

As shown, the inner wall 37 of the vessel is spaced from the distilling tube to provide a passageway 45 which communicates with the passageway or space 21. The vaporized liquid air rising out of vessel 36 is to flow through these passageways. Perforations 38 may be provided in the inner wall 37 through which unvaporized liquid air may spill over into passageways 45 and 21 to provide additional cooling means for the distilling tube for purposes of producing reflux and for condensing vapors in the lower portion of the tube as will hereinafter be more fully set forth. Passageway 45 is closed at the top by the stopper 47 which plugs the end of the column.

Distilling tube 18 is enlarged at the lower end to form a distilling bulb 50 into which the sample to be distilled is introduced through an inlet pipe 52. The latter is connected with sample containers 11 and 12 through a three-way cock 53 which controls the flow from these containers. Inlet pipe 52 is in the form of a glass tube which extends through the base of the distilling bulb and is sealed in place therein. The discharge end 55 of the inlet tube is well above the liquid level of the sample introduced into bulb 50 for distillation and is so arranged that liquid condensate formed in tube 18 cannot back up into the entering tube and ultimately freeze and crack the stop-cock.

A second glass tube 56 is sealed into the bottom of distilling bulb 50. This tube establishes communication between bulb 50 and a mercury bottle 58 or between the bulb and a graduated receiver 59 through a three-way stop-cock 60. The mercury in the mercury-bottle is utilized to seal the sample in the distilling bulb, and the receiver 59 is utilized to receive the residue of the sample after distillation in a manner to be described.

The distilling bulb may be graduated as at 62, and tube 56 as at 63. The graduations on the large diameter bulb naturally represent relatively large volumes of liquid per unit distance between the graduations, thus making the estimation of accurate volumes between these graduations difficult. By virtue of the graduations on the small diameter tube 56, however, the operator is enabled to determine the amount of sample in the bulb by manipulating the mercury level to fix the upper liquid meniscus exactly on one of the major graduations on the bulb and by reading the additional fractional amount on the small diameter tube graduations. It is thus possible to readily determine the amount of sample in the bulb at any time, either at the beginning, during, or after distillation. Heretofore, the amount of sample introduced into the prior art distilling bulbs could be determined only by calculations based on the determined amount of vapor distilled during a run and from the amount of residue removed from the column at the end of the distillation.

Distilling bulb 50, at its upper end, is provided with an inwardly tapered shoulder 64, ground on the top surface thereof, which matches an opposed, similarly ground shoulder 65 on the lower enlarged portion of inner wall 23 of the vacuum jacket in which bulb 50 is housed. Between the opposed ground shoulders there is positioned a gasket 67 which closes the bottom of passageway 21. Liquid air flowing down passageway 21 is thus held by the gasket surrounding the top of the distilling bulb to provide pre-cooling sufficient in some cases to condense vapors or gases supplied to the bulb and requiring condensation prior to distillation. The gasket also serves to prevent the flow of vaporized liquid air around the bulb.

The vaporized liquid air at the bottom of passageway 21 is discharged to the atmosphere through a moderately flexible, spiral, glass coil 69, the lower end of which is joined to an opening in inner wall 23 of the vacuum jacket, as at 70. Coil 69 is provided with extension conduit 71 which extends upwardly in the jacket, preferably outside of reflector 30, and passes out through an opening in the outer wall 25 of the jacket as at 73, (Figs. 4 and 5).

Heat is supplied to the contents of the distilling bulb 50 as by the metal-clad, cartridge-type, resistance heater 75 which extends into an "off-centered" inverted glass heater well 76 formed in the bottom of the bulb. The current supply wires 78 of the heating element 75 lead from the element to the conventionally illustrated rheostat R, which may be controlled to accurately regulate the heat input to the liquid portion of the sample in the distilling bulb in order to effect a desired rate of vapor formation. Any other suitable heating means may be employed. A metal ferrule 78 is positioned over the lower end of the vacuum jacket.

The heated vapors rise in the distilling tube and are cooled, and condensed to provide reflux as by the vaporized and/or unvaporized liquid air or other cooling medium in passageways 21 and 45. Thus, liquid air may be introduced into vessel 36 through a vacuum-jacketed, silvered tube 80 communicating with a Thermos bottle 81 containing the liquid air. By the supercooling of the distilling tube wall below the natural temperature gradient of the column such as would correspond with adiabatic conditions, or substantially adiabatic conditions as secured by effective insulation (as in the column of my prior patent hereinbefore referred to), the fractionating effectiveness of the column is increased by as much as 100%. These results are entirely unexpected and cannot be derived from present-day theory and practice of fractional distillation.

The temperature of the vapors flowing from the tube to manifold 13 is indicated by millivoltmeter V in the circuit of thermocouple 82. A refrigerant in Thermos bottle 85 provides a cold junction. Manometers 83 and 84 are provided for measuring the pressure within the distilling tube and vapor receiving containers respectively. Three-way cocks 86 and 87 are provided at the junctures of the manometer tubes with the manifold. Receivers 14 and 15 communicate with three-way cocks 88 and 89 in the manifold through pipes 90 and 91 respectively. A regulating cock 92 is placed in the manifold between cocks 86 and 87 to control the starting and rate of distillation. Beyond cock 89 is an exhaust line 93 leading to a vacuum pump 94 by means of which the distilling tube, manifold connections and receiving vessels may be evacuated before starting the analysis.

The following procedure may be followed for analyzing a sample of a liquid, for example, natural gasoline. Before introducing the sample to the distilling bulb 50, the apparatus is evacuated, cock 92 closed and liquid air is then introduced into vessel 36 to provide liquid air vapors for cooling the passageways 45 and 21. Stop-cock 60 is now turned to admit mercury from bottle 58 to conduit 56, and the bottle 58 is elevated to cause the mercury to rise in the conduit to the bottom of the bulb to provide a seal for the liquid sample to be admitted therein. Stop-cock 60 is now closed and stop-cock 53 is opened to admit the desired quantity of liquid to the distilling bulb. Stop-cock 53 is now closed and heat is supplied to the sample.

After introducing the sample to the bulb, the pressure in tube 18 is somewhat below atmospheric, and, in starting the distillation, the pressure is brought, preferably, to approximately atmospheric by applying heat to the sample while maintaining stop-cock 92 closed. The vapors rising in tube 18 are condensed and returned to the main body of the sample. During this stage of the analysis, it may be desirable to introduce sufficient liquid air into vessel 36 so that the liquid air spills through openings 38 and flows down passageways 45 and 21 along with vaporized liquid air. Thus, both the vaporized and unvaporized liquid air is utilized to condense the vapors rising in the tube.

When conditions are satisfactory within the distilling tube, the flow of liquid air to vessel 36 is regulated to provide the requisite amount of liquid air to secure the desired reflux in the tube, and stop-cock 92 is cracked to start distillation. The fractionated vapors passing out of the tube flow slowly into receiver 14; cocks 86, 87 and 88 are, of course, open and cock 89 closed. Frequent simultaneous readings of the millivoltmeter V and of the manometer are recorded. From this data the operator later constructs a graph of vapor temperature (corrected to a standard pressure) against the amount of vapor distilled. Since accurate analysis is dependent upon the maintenance of a reasonably constant temperature in container 14, as well as container 15 to be later referred to, these containers are preferably immersed in liquid in constant temperature tanks 96 and 97 respectively. The temperature of the liquid in the respective containers is shown by thermometers 98 and 99. The liquid may be maintained at the desired constant temperature in any desired manner.

When a rapid rate of distillation is maintained, the vapor flow through the manifold may be of such velocity as to cause the pressure indicated by manometer 83 to differ from the vapor pressure in the receiver. To eliminate this error, cock 92 may be closed momentarily to obtain a pressure reading while the flow of vapors through the manifold is interrupted. Should the fractionating tube flood at any time, the distillation may be immediately stopped, as by closing cock 92 until the tube is again operating properly. Such flooding becomes an extremely rare occurrence, in operating with supercooling of substantially the entire length of the tube during distillation in accordance with the present invention.

During distillation, the vapor temperature may remain almost constant for a substantial period, indicating that one of the volatile hydrocarbon constituents is being fractionated from the sample. After substantially all of this hydrocarbon has been distilled, the vapor temperature tends to rise. This temperature rise is prevented by retarding the rate of distillation, for example, by adjusting cock 92, and the reflux ratio is thereby increased to insure that substantially all of the hydrocarbon is sharply fractionated and distilled in pure state. During distillation the pressure within the tube is maintained reasonably constant, this being largely due to the effective super-cooling of the tube. Obviously, this pressure must be insufficient to condense the distilled fractions in the manifold and receiver.

The general procedure just outlined is continued until each of the hydrocarbon constituents of the sample is distilled. The fractions are thus distilled off one by one until there remains in the distilling bulb a residue composed of such high boiling hydrocarbons that further distillation is rendered difficult and impractical. At this point, distillation is discontinued, as by closing cock 92 and discontinuing the heating and cooling of the tube. The tube is then vented to the air, the mercury returned to bottle 58 and the residue discharged through conduit 56 to measuring container 59.

In the analysis of a gas sample, for example, receiver 15 is used for the reception of fractionated vapors; receiver 14 being cut out of the system as by cock 88. A fairly large sample of gas is usually required in an analysis thereof in order to provide a substantial volume of condensate for distillation in the distilling tube. The gas sample may be taken from any desired source, for example, from container 12 where a measured sample of gas is held at a pressure, preferably, above atmospheric. In contradistinction to the prior art, no pre-cooling of the sample introduced into the column is necessary.

The apparatus, including distilling tube 18, manifold 13, and receiver 15 is first purged and then evacuated. Cock 92 is now turned to cut off the column from the remainder of the apparatus and distilling bulb 50 is sealed with mercury as described above.

Cock 53 is cracked to allow the gas from container 12 to flow into the distilling tube through the gas drying tube 100 and sample inlet 52. During the introduction of the gas into the tube, the pressure therein builds up to atmospheric or greater. An excess of liquid air is now introduced into vessel 36 and vaporized liquid air and unvaporized liquid air are caused to flow into passageways 45 and 21 as described above to supercool and condense the vapors in the tube. After feeding the gas sample to the distillating tube, cock 53 is closed. When substantially all of the vapors in the tube have been condensed, the supply of liquid air to vessel 36 may be cut down to provide only vaporized liquid air to the passageways 45 and 21. The condensed gas fractions in the distilling bulb are now subjected to fractional distillation in the same manner previously described in connection with the analysis of natural gasoline. It is, of course, to be understood that the pressure within the tube is so maintained that no condensation of the distilled fractions takes place in the manifold and receiver.

Figure 7:
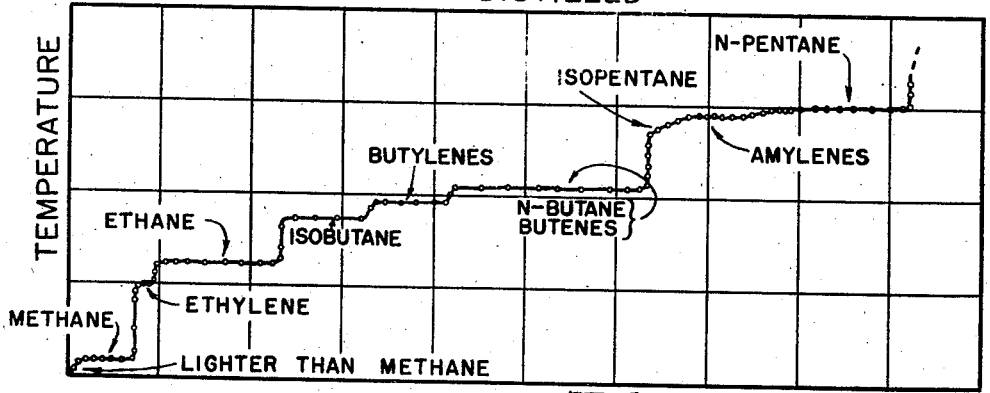
Figure 8:
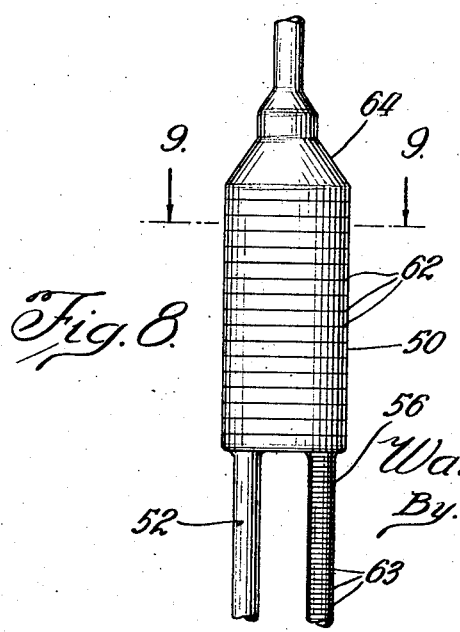
Fig. 8 is a fragmentary elevation of the distilling bulb portion of my fractionating column.
Figure 9:
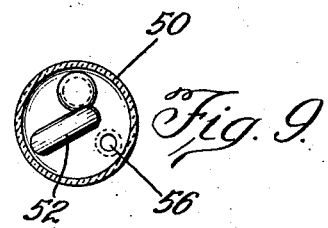
Fig. 9 is a transverse section thereof taken along the line 9—9 of Fig. 8.

In Figs. 6 and 7 there are shown typical graphs of results plotted from a distillation of cracked refinery gas in which the fractionated compounds range from methane to n-pentane; the amount of vapor distilled, as measured in the receiver, being plotted against the temperature at the fractionating column outlet. The graph of Fig. 6 was plotted from the readings obtained by conducting an analysis in representative low-temperature fractionating column of the prior art, and the graph of Fig. 7 plotted from readings obtained by conducting the analysis in the apparatus and by the process of the present invention. Identical samples were analyzed in each instance.

In general, the irregular curves illustrated in the graphs serve to identify and determine the amounts of the various fractionated compounds as well as to show the sharpness with which these compounds were fractionated and their state of purity. Thus when substantially all of a particular fraction has been distilled off, the curve should rise almost vertically to the vaporizing temperature of the next heavier compound in the series. The curves connecting the plateaus indicate the sharpness of the fractionation of the compounds represented by the plateaus; the more nearly vertical the rise of the curves the sharper the fractiation. The purity of the fractionated compounds is indicated by the slope of the plateaus. If they are horizontal, the compounds are pure. The extent of deviation from horizontal indicates the degree of impurity of the compounds.

From the foregoing it is apparent that the fractionating effectiveness of the fractionating column of my present invention is superior to that of the prior art. Ethylene and isobutane are fractionated as isolated, relatively pure compounds in accordance with my invention, whereas heretofore these compounds were fractionated in admixture with ethane and butanes respectively. In accordance with my invention, the C4 compounds above isobutane are sharply fractionated into two close-boiling fractions of which one consists of n-butylene and isobutylene boiling only 1° C. apart and the other consists of n-butane and the two dimethyl-ethylenes boiling within a range of 2.8° C. In addition, it is to be noted that the plateaus of Fig. 7 extend, in general, more horizontally than the plateaus of Fig. 6, thereby indicating that relatively purer compounds are obtained by my method and apparatus. It is also obvious that my present fractionation of compounds is sharper than heretofore.

It is obvious from the foregoing description that my system of analysis may be applied to the testing of liquids or gases, or mixtures thereof.

I claim:

1. Apparatus for precise analytical fractionation comprising an elongated distilling tube, a distilling bulb at the lower portion of the tube, said bulb having an inlet conduit for the introduction of a sample to be distilled to said bulb and means for sealing the sample in the bulb, an evacuated jacket surrounding the tube with the inner wall thereof spaced from the tube substantially throughout the length thereof to provide a relatively wide space between the tube and jacket at the upper portion of the tube and a lower relatively narrow cooling space between the jacket and the rest of the tube, a reflux cooling vessel in said relatively wide space having heat conducting walls positioned about said tube and spaced therefrom to provide a relatively narrow passage between the tube and vessel communicating with said lower narrow space, said reflux cooling vessel opening into said passage between it and the tube, and means for supplying a vaporizable refrigerant fluid in said reflux cooling vessel whereby the vapors of said fluid enter said passage and flow down along the tube through said relatively narrow cooling space to cool the tube and means for venting said vapors from the space adjacent the bottom of the tube to the atmosphere.

2. Apparatus for precise analytical fractionation comprising an elongated rectifying tube having a distilling bulb at the lower extremity thereof, an evacuated insulating jacket surrounding the tube and bulb with the inner wall of the jacket spaced from said tube and bulb to provide a space therearound substantially throughout the length thereof, a gasket intermediate said inner wall and said bulb adjacent the lower end of said tube, said gasket forming a closure for the lower extremity of the space surrounding said tube, a reflux cooling vessel adjacent the upper extremity of said space in communication with the space therebelow, said vessel having heat conducting walls positioned about said tube, means for introducing a cooling medium into said vessel and, in turn, to the space therebelow, and means for exiting said cooling medium from said lower extremity of the space surrounding said tube, said means including a flexible conduit establishing communication between said lower extremity and the exterior of said jacket above said lower extremity.

3. Apparatus for precise analytical fractionation comprising an elongated rectifying tube, an evacuated insulating jacket surrounding the tube with the inner wall thereof spaced from the tube to provide a cooling space between the tube and the jacket substantially throughout the length of the tube, means in said space adjacent the upper portion of said tube adapted to receive a cooling medium for cooling vapors rising in the tube and provide reflux, said means communicating with said space about the tube below said means, means for supplying vapors to said tube, means for supplying a cooling medium to said cooling medium receiving means and, in turn, to the space therebelow and means for venting said cooling medium after it has coursed down and around the tube through said space.

4. Apparatus for precise analytical fractionation comprising an elongated rectifying tube, an evacuated insulating jacket surrounding the tube with the inner wall thereof spaced from the tube to provide a cooling space between the tube and the jacket substantially throughout the length of the tube, means in said space adjacent the upper portion of said tube adapted to receive a cooling medium for cooling vapors rising in the tube and provide reflux, said means communicating with said space about the tube below said means, means for supplying vapors to said tube, means for supplying a cooling medium to said cooling medium receiving means and, in turn, to the space therebelow and means for venting said cooling medium after it has coursed down and around the tube through said space, said venting means comprising a flexible conduit establishing communication between the lower extremity of said space and the exterior of said insulating jacket above said lower extremity.

5. Apparatus for precise analytical fractionation comprising an elongated rectifying tube, a distilling bulb at the lower extremity of the tube, an evacuated insulating jacket surrounding the tube with the inner wall thereof spaced from the tube to provide a cooling space between the tube and jacket substantially throughout the length of the tube, means in said space adjacent the upper portion of said tube adapted to receive a cooling medium for cooling vapors rising in the tube and provide reflux, said means communicating with said space about the tube below said means, and means for supplying a cooling medium to said cooling medium receiving means and, in turn, to the space therebelow, said distilling bulb having an inlet conduit extending into the interior of the bulb with the discharge end of the conduit well above the bottom of the bulb and so arranged that reflux from said tube cannot fall into it, and a second conduit establishing communication between said bulb and a mercury bottle, each of said conduits having a valve for controlling the supply of fluid thereto.

6. Apparatus for precise analytical fractionation comprising an elongated rectifying tube, a distilling bulb at the lower extremity of the tube, an evacuated insulating jacket surrounding the tube with the inner wall thereof spaced from the tube to provide a cooling space between the tube and jacket substantially throughout the length of the tube, means in said space adjacent the upper portion of said tube adapted to receive a cooling medium for cooling vapors rising in the tube and provide reflux, said means communicating with said space about the tube below said means, and means for supplying a cooling medium to said cooling medium receiving means and, in turn, to the space therebelow, said distilling bulb having an inlet conduit for the introduction of a sample to be distilled to said bulb and a conduit establishing communication between said bulb and a mercury bottle whereby mercury from said bottle may be introduced into said conduit to seal the sample in said bulb, major graduated divisions being provided on said bulb and minor graduated divisions being provided on said second-named conduit whereby accurate measurement of the sample may be made, each of said conduits having a valve for controlling the supply of fluid thereto.

7. Apparatus for precise analytical fractionation comprising an elongated rectifying tube, a distilling bulb at the lower portion of the tube, said bulb having an inlet conduit for the introduction of a sample to be distilled and means for sealing the sample in the bulb, an evacuated jacket surrounding the tube with the inner wall thereof spaced from the tube to provide a cooling space between the tube and jacket substantially throughout the length of the tube, a reflux cooling vessel adjacent the upper extremity of said space, said vessel having heat conducting walls positioned about said tube and spaced therefrom to provide a relatively narrow passageway communicating with the space therebelow, said reflux cooling vessel opening into said passageway, and means for supplying a vaporizable refrigerant fluid in said reflux cooling vessel whereby the vapors of said fluid enter said passageway and flow down along the tube through said space therebelow, and means for venting said vapors from the space adjacent the bottom of the tube to the atmosphere.

WALTER J. PODBIELNIAK.